United States Patent [19]

Harter et al.

[11] Patent Number: 4,787,030

[45] Date of Patent: Nov. 22, 1988

[54] DATA PROCESSING APPARATUS WITH FIXED ADDRESS SPACE

[75] Inventors: Ronald S. Harter, Saugerties; Jeffrey S. Lucash, Hurley; Robert J. Major, Red Hook, all of N.Y.

[73] Assignee: International Business Machines Corporation, Armonk, N.Y.

[21] Appl. No.: 98,107

[22] Filed: Sep. 16, 1987

Related U.S. Application Data

[63] Continuation of Ser. No. 665,225, Oct. 26, 1984, abandoned.

[51] Int. Cl.⁴ ............................................. G06F 13/14
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,027,108 | 5/1977 | Moorehead et al. | 379/287 |
| 4,253,144 | 2/1981 | Bellamy et al. | 364/200 |
| 4,268,901 | 5/1981 | Subrizi et al. | 364/200 |
| 4,356,475 | 10/1982 | Neumann et al. | 340/521 |
| 4,373,181 | 2/1983 | Chisholm et al. | 364/200 |
| 4,562,535 | 12/1985 | Vincent et al. | 364/200 |
| 4,563,736 | 1/1986 | Boudreau et al. | 364/200 |
| 4,626,634 | 12/1986 | Brahm et al. | 379/28 |
| 4,713,834 | 12/1987 | Brahm et al. | 379/28 |

Primary Examiner—Gary V. Harkcom
Assistant Examiner—Randy W. Lacasse
Attorney, Agent, or Firm—Joseph J. Connerton; Frederick D. Poag; Mark S. Walker

[57] ABSTRACT

A CPU initializes pluggable adapters with built-in identity and conditional ROS and complies a Hardware First Level Interrupt Handler (HFLIH) table of identity against status register address and a Software First Level Interrupt Handler (HFLIH) table of identity against on-board system function. It stores the tables with a control module in enabled memory on the keyboard adapter. Conditional ROS is enabled on a given adapter receiving a broadcast of its own identity. Adapter interrupts are ORed. HFLIH is stepped through by the control module to access adapter status sequentially, servicing each adapter in turn from its ROS, using its broadcast identity. The enabled adapter appears as a single entity to the central processor and occupies a single window in the address space which is common to all of the adapters but used by only one at a time. System functions are accessed via HFLIH.

7 Claims, 5 Drawing Sheets

DATA PROCESSING APPARATUS WITH FIXED ADDRESS SPACE This application is a continuation of application Ser. No. 06/665,225, filed Oct. 26, 1984, now abandoned.

BACKGROUND OF THE INVENTION

Field of the Invention

This invention relates to processor systems, and more particularly to an improved method and means for accommodating variable amounts of memory resident on pluggable devices potentially exceeding the available memory address space of the system.

Description of the Prior Art

During the power on sequence of various personal computers and intelligent work stations, a range of code residing in Read Only Storage (ROS) is automatically executed. This code initializes the system such that the hardware is tested, put into a known state, and system parameters are defined. As part of this sequence, a number of hardware adapters must be initialized.

Typically, each adapter has its own ROS associated with it and the base ROS (on the system board) implements a well defined algorithm to identify these adapter ROS modules and execute them. Each adapter then requires a certain range of address space with the systems memory map. As more and more adapters are integrated into the system, more and more system memory address space is consumed. Since memory address space is a finite resource, the administration of address space become a difficult problem.

Additionally, many adapters' ROS modules must provide code to service hardware interrupts associated with the device. This does two things:

1. Places a greater demand on limited address space
2. Requires a solution to the address space problem to allow continued support of an interrupt handler operation.

Techniques are known in the prior art for maximizing use of system address space by eliminating gaps between volumes requisitioned by devices. In a system described in U.S. Pat. No. 4,025,903, memory is provided as pluggable modules with self-adjusting addressing by communication amongst themselves. The size of the address space required by each individual module is permanently stored in the module and is used to calculate, internally of each module, the memory addresses of the module (i.e., the device) based on an address communicated by the next lower module. While such systems eliminate waste in adress space assignment, the address space required is still the aggregate of the individual device requirements and may exceed the address space available.

In the prior art, limitation of address space has been relieved by memory address expansion schemes. For example, in some systems, data is placed in one address volume and commands in another. In other systems, high order bits of each address are used to point to registers in a matrix which supply a larger number of bits which replace those high order bits so as to create an address space of increased size. Such prior art schemes, while useful in individual employments, carry with them system architecture requirements which cannot be satisfied by simple modification of systems designed for a single, fixed size address scheme.

It is also known to provide add-on feature units having a numerical rank in which they are serviced. For example, features added to a system may share a common attention line, and when a general poll is passed to the features, the identity of the lowest numbered feature requiring service is returned in terms of its number.

SUMMARY OF THE INVENTION

In accordance with the present invention, a distributed ROS scheme requires each adapter card in the computer system to support its own ROS module. These adapters or modules all share the same addres space, e.g., 4 Kbytes at CB000x. In order to guarantee that addressing capability within any one of these modules is active at one time, each adapter is characterized by three factors:

1. Supports a select register resident in or architecturally associated with the adapter at a common I/O address.

2. Is assigned a unique identification number.

3. Supports logic such that when the select register is written with a data value, the logic enables addresing capability within the adapter's ROS module only if the data value matches the adapters assigned unique identifier (I.D.). If the data value does not match the assigned I.D., the addressing capability of that adapter is disabled.

In accordance with another aspect of the invention, software supports the above hardware selection mechanism by providing a Distributed ROS nucleus. This nucleus is invoked by the base system ROS through that ROS's well defined algorithm. This occurs at system initialization. At system initialization, the Distributed ROS nucleus pages in all ROS modules, validates them, and allows their adapter initialization code and adapter diagnostic code to be executed. If the adapter requires interrupt handler services during normal system operation, and it provides interrupt handling code within its ROS module, the nucleus code will add this adapter's information to an adapter configuration table which is used to support interrupt handler services during normal operation. This scheme is possible because each Distributed ROS module is required to support a well defined protocol, e.g., in the leading bytes of the module. This protocol identifies the module as valid; identifies whether or not an interrupt service routine is present and whether interrupt services are required during normal operation; and provides other miscellaneous information.

During normal processing, interrupts occur at which time an adapter may require interrupt servicing. In accordance with other aspects of the invention, on hardware interrupts, a Distributed ROS nucleus module receives control. This module polls status registers on board the adapter units and accessible via system register addresses found in an adapter configuration table which was constructed from the protocol information found in each Distributed ROS module.

Upon detecting an interrupting device, this nucleus module pages in the current ROS module (by use of the unique identification number found in the adapter configuration table) and jumps to a fixed point within that adapter's ROS module where an interrupt service routine exists. This allows effective sharing of interrupt levels and continues to support interrupt service requirements placed on a ROS scheme.

Thus the Distributed ROS scheme of the invention solves the address problem by sharing the same address space among several adapters. It manages this address space through a hardware paging technique under software control. It continues to support interrupt servicing requirements thereby meeting all requirements placed on the scheme.

Accordingly, in accordance with one aspect of the invention there is provided data processing apparatus having a central processor connected to a plurality of ports to any or all of which may be attached a selection from a group of compatible devices, each incorporating means signifying its individual identity, some of the devices of the group including memory and a status register, requests for service from attached devices being ORed to the central processor, the central processor being arranged on power up and system reset to initialize and determine the nature and location of the currently attached devices, the central processor including a memory accessing facility for accessing memory in terms of a fixed size address space and a register accessing facility for accessing individual registers in attached devices using register addresses which are independent of the memory address space, wherein:

(a) the initializing facility includes means for generating a (first) list associating the individual identity of each attached device including memory with the register address of the status register of that device;

(b) the centeral processor is arranged to respond to a request for service by accessing the list and by indexing through the list, examining the status of each listed device in turn to determine if the currently examined device requested service and, if so, broadcasting the identity of that device followed by one or more memory addresses; and (c) each device having memory also includes means for comparing each broadcast identity with the identity of the device and, on detecting equality, for latching the associated memory enabled, until the first detected inequality.

According to another feature of the invention, a plurality of code modules are individually connectible into a processor system at the same address segment of the system, by operation of address decoding means in each module responsive to addresses in said segment but normally disabled, said decoding means of each module being uniquely enabled by a signal broadcast to all of said modules but identifying only one.

According to another feature of the invention, the system includes a table identifying the modules attached to the system and a pointer to the operative status of each, and means responsive to the table contents to formulate enabling signals to be broadcast, one at a time, to the modules.

Thus, it is an object of the invention to provide, in a microprocessor based workstation system or the like, an improved flexible and expandable architecture as aforesaid.

It is another object of the invention to provide in an architecture as aforesaid, modules of code corresponding to optional features, wherein said modules share memory space in a manner suited to the basic organization of the system.

Still another object of the invention is to provide an improved method and means to support the dynamic integration of hardward adapters into a computer system (including the testing, initializing and servicing of such adapters) through a software controlled hardware paging technique.

Other objects of the invention will be apparent from the foregoing and from drawings, detailed description and claims.

DETAILED DESCRIPTION

General discussion

A conventional data processing system of the kind which corresponds to a data processing system provided by the present invention can be said to include a central processor connected to a large but fixed number of ports any or all of which may be attached devices, whether directly or by way of adapter, such devices including memory and/or function and in-built identity. The central processor defines a fixed size address space onto which is mapped, in an individual window, the memory or function of each valid attached device. The current status of each attached device is maintained in a register or latch, on or off the device, the status location being accessed by an address which does not occupy a position in the fixed size address space defined by the processor. For those operations which may be invoked in relation to a set of such devices, access is made sequentially to each appropriate window.

In the arrangement of the present invention, on initialization of the system, each port is tested in turn, and, if a device is attached thereto, that device is tested and initialized. If this process is successful, the identity of that device is added to one or other of a pair of logs, built up this way during initialization, for that set of devices. One log associates the device identity with the status address for that device and the other log associates the device identity with the function provided by that device.

In operation, when an operation is invoked in relation to that set of devices, by use of one or other of the logs built up during initialization, the interested and only the interested devices of the set, by definition, installed and valid, appear to the central processor as a single device occupying a single window in the fixed size address space. The central processor accesses a default location in the address space for the set and is directed to the logs. If a function is required, it will be passed to a given area of an identified device using the function/identity log. If a service operation is required, the other log is used to examine the status of each device in turn, the processor passing to the next device if the perceived status is not appropriate to the operation. Otherwise, the stored identity is used to access the memory on the device even though the processor uses the window of the fixed size address space assigned to the function above referred to. The identity is, in either case, broadcast to all devices, only that device that has that identity built into it, being enabled. Thus, with the arrangement of the present invention, only one window in the fixed address space is required to service all the attached devices belonging to the set, together with a single default address, rather than requiring a default address and a window per device. This can be regarded as a memory expansion mechanism, a memory mapping mechanism or a memory paging mechanism but is, in reality, the reverse of a virtual device mechanism.

Figure 1:
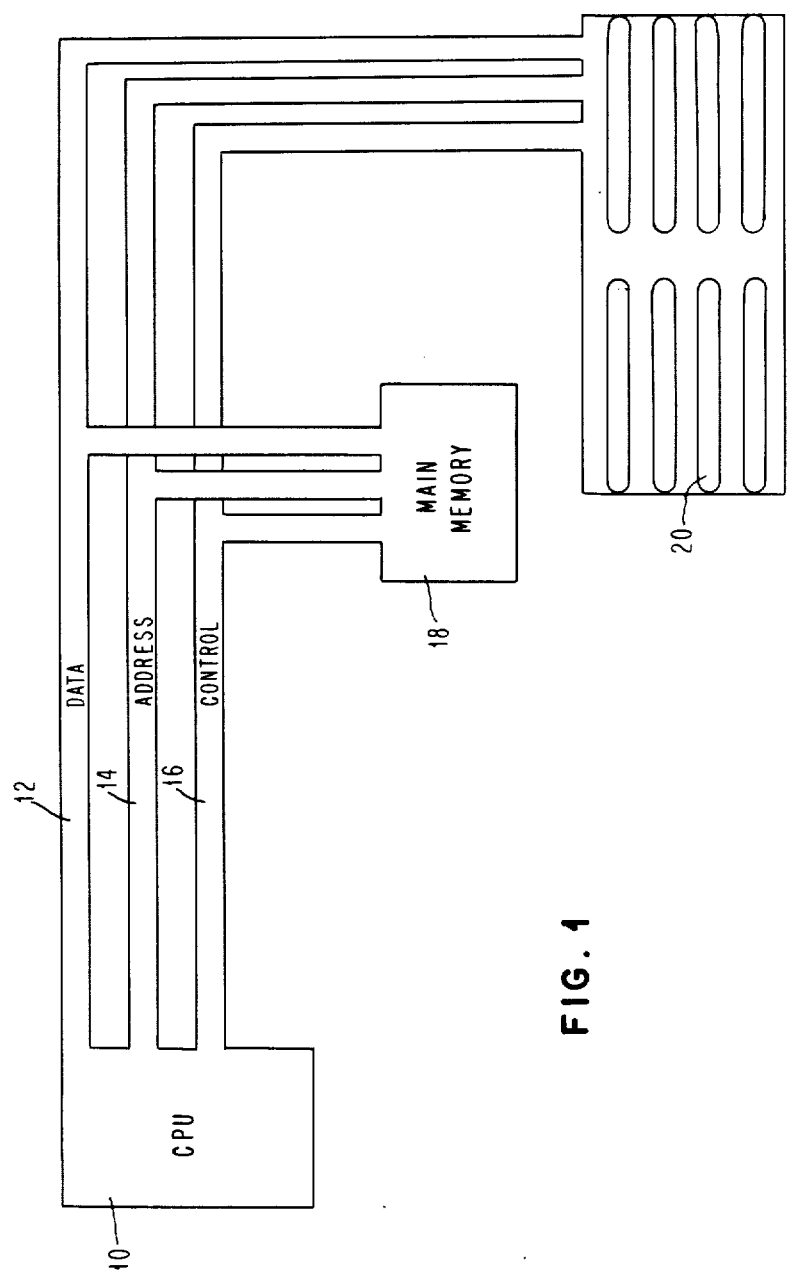
FIG. 1 is a diagramatic showing of a system embodying the invention.

For the purpose of detailing one embodiment of the present invention, modification of a known processor having a fixed address space and a separate register address space has been assumed. FIG. 1 illustrates only those features of that processor, an IBM (IBM is a registered trademark) Personal Computer/XT which is germane to the present invention. This processor has a central processing unit (CPU) 10 communicating with three separate bus structures, a data bus 12, an address bus 14, and a control bus 16. These three structures interconnect the CPU 10 with, among other things, main memory 18 and eight sockets 20, sometimes called "slots" but referred to herein as "ports". Various modules are provided in the form of printed circuit cards which can be plugged into the sockets, at the will of the user, to form a variable part of the processor. Clearly, being physically pluggable is not sufficient. Modules which can form part of a processor must be logically compatible and form a group of modules from which a current selection can be made.

Figure 2:
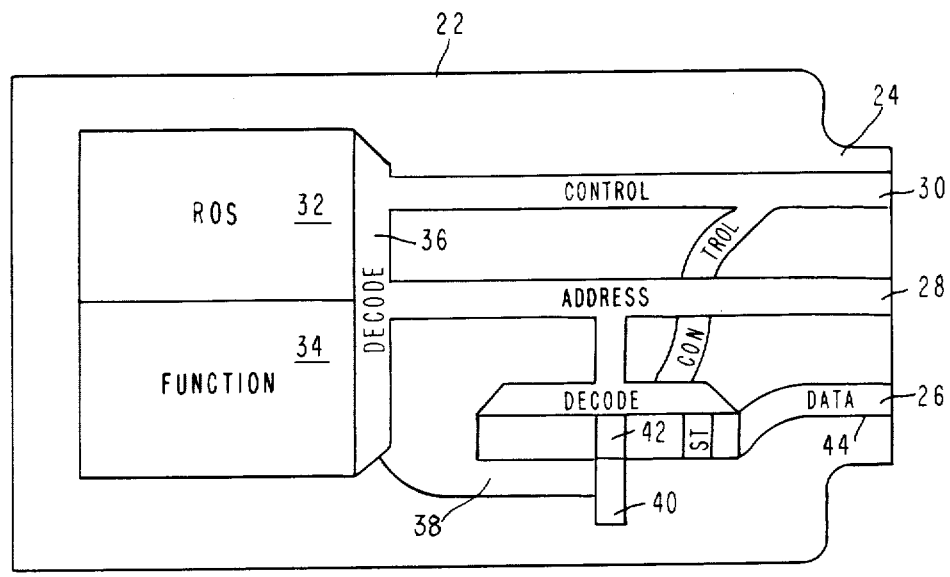
FIG. 2 shows an individual pluggable device of the system of FIG. 1.

FIG. 2 represents, schematically, features of a pluggable module in accordance with the invention. The module comprises a card element 22 having a plug portion 24 including contact areas 26, 28, 30 which make contact with corresponding conductors in any one of the sockets 20 when the card 22 is plugged into it.

The module carries read only storage (ROS) 32 and function circuits 34 which are accessible via a decode mechanism 36 which, however, is normally disabled and remains so unitl enabled by a signal on line 38 raised by an ID compare circuit 40. The ID compare circuit 40 is activated by and during the presence of an ID value in register 42 if that value matches the ID permanently "burnt in" the card. The ID number is one which has been broadcast to all cards in sockets 20 and is recorded in a register 42 which constitutes part of the I/O register set of the system and has an address which is the same for all of the cards 22. The register 42 is written with data received on the data bus 44 of the card as a step in the module addressing in accordance with the invention.

Figure 3:
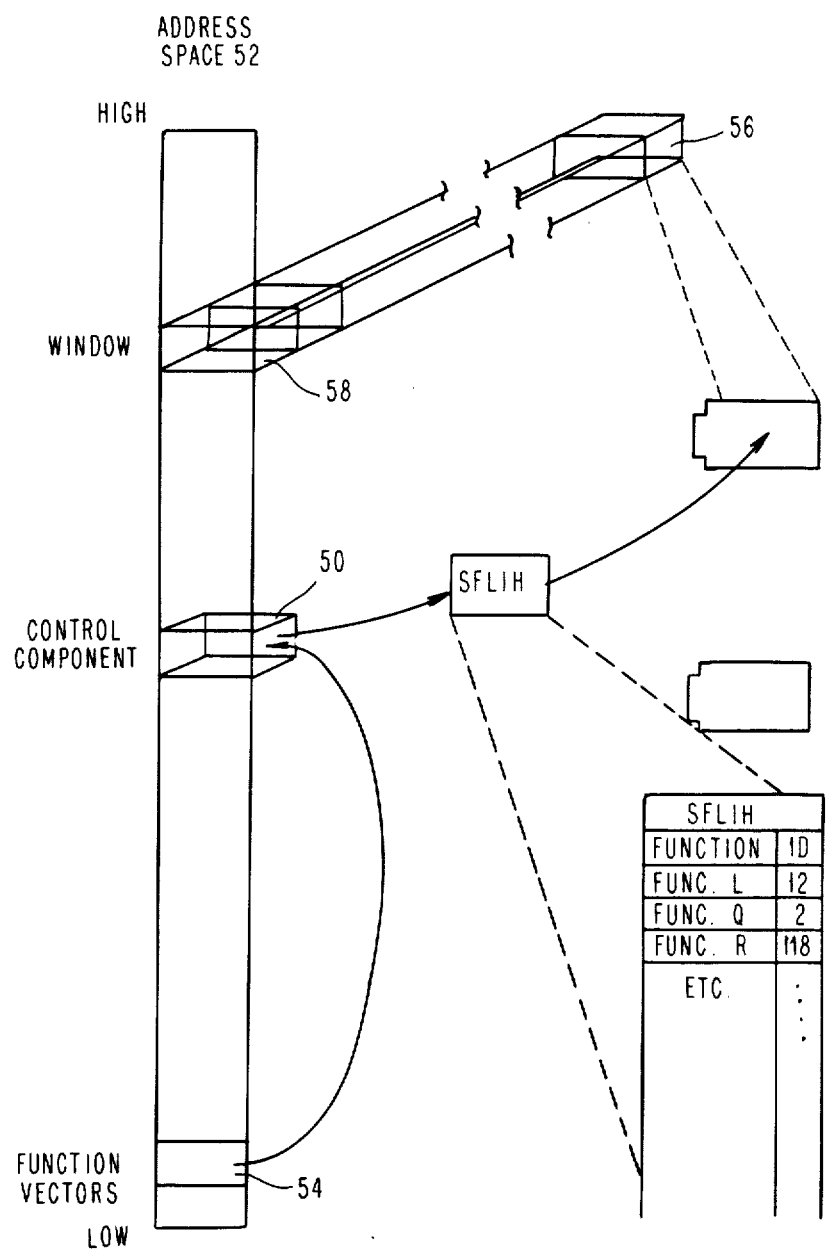
FIG. 3 is a representation of the organization of the memory address space of the system of FIG. 1, as employed in servicing a software interrupt, together with a table (1.1.2.2) of software intervention vectors utilized by the system.
Figure 4:
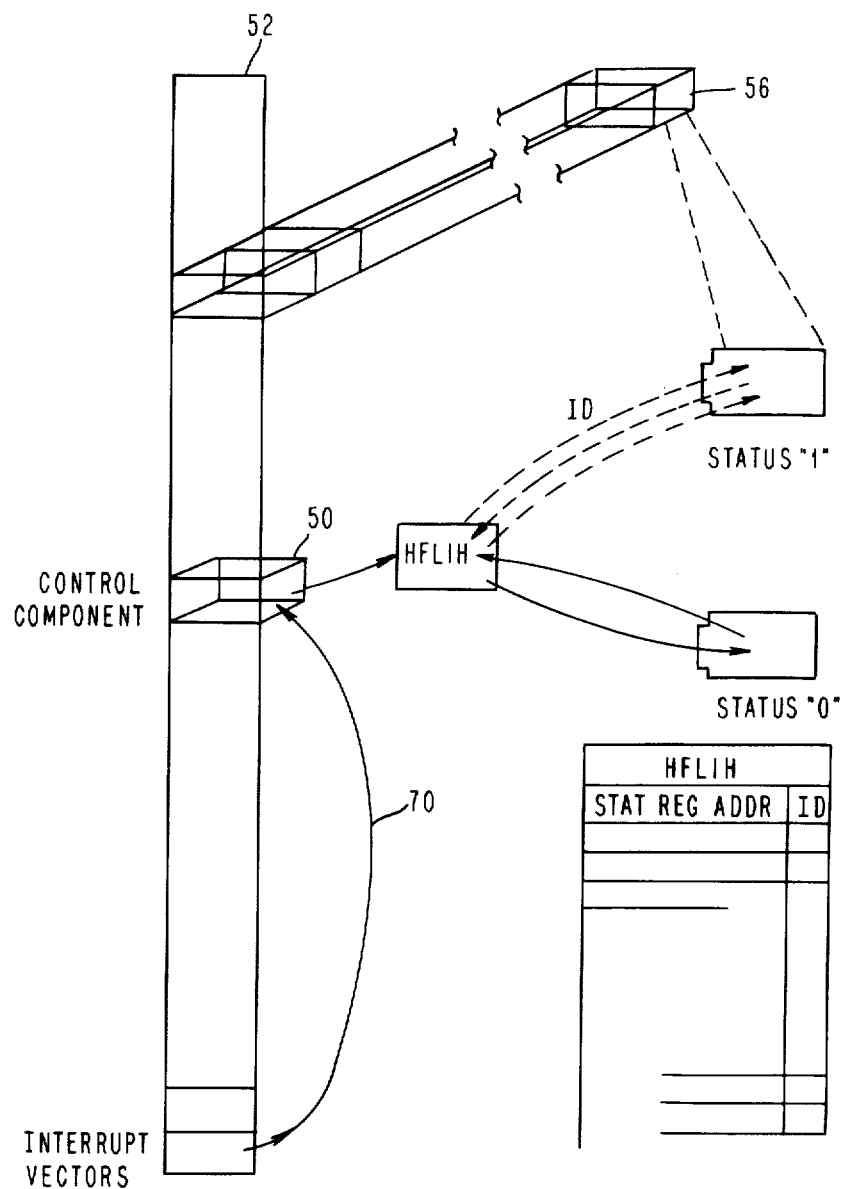
FIG. 4 is a diagram representative of the handling of a hardware interrupt in accordance with the invention, together with a system configuration table (1.1.2.2.) utilized in the control of the system.

Referring now to FIGS. 3 and 4, as set forth in the summary of invention, during system initialization, the presence of cards in sockets is detected and tables are created of the identification numbers (IDs) of the cards which populate the sockets, the individual address of the status register of each card, and the function, if any, carried on the card. This information is organized into two tables, the software first level interrupt handler table (SFLIH), and the hardware first level interrupt handler (HFLIH), each accessible through a control component or nucleus having an address indicated at 50 in the overall address space 52 of the system.

In the software interrupt handling procedure illustrated by FIG. 3, a function vector in address area 54 is utilized to examine the SFLIH table via an address in segment 50, whereby the system can determine the ID which is unique to the function desired. This ID is then broadcast to all cards plugged into the sockets 20 and is received in a register in each of them but compares to the ID in only one of them. In that one card, the resulting successful comparison enables the address decoding mechanism of the card. Thereafter, the card can be communicated with by addresses of a fixed window space 56 in the address space 52 scheme of the system. All cards installed in the sockets 20 share this same address space window, but the address decoder of only one of them is enabled and therefore operations can proceed with that one as if it were installed at window 58 of the address space.

In the case of the handling of hardware interrupt vectors, more steps are needed since the activity was not system initiated and therefore the system must first determine which card or module requires service. This operation is illustrated in FIG. 4. When a module acts, via the interrupt handler of the system (not shown) to request service, an interrupt vector points to a routine in the control component as indicated at 70, whereupon the HFLIH table is consulted to test the status of each card having an ID posted in the HFLIH table. The HFLIH contains the status register addrsess of each device which provides memory. The control component causes the status registers so identified to be accessed, one at a time. Whenever a status is encountered which indicates that service is required, the control component broadcasts the ID associated, in the HFLIH, with the register address currently being used. The result is that the memory on the device providing that status is enabled, causing a service cycle to be initiated in the usual fashion but utilizing the common address window 58 as the address space for that card.

If, on the other hand, the status register of the addressed card does not indicate need for service, the next card in the HFLIH table is interrogated in the same manner.

Figure 5:
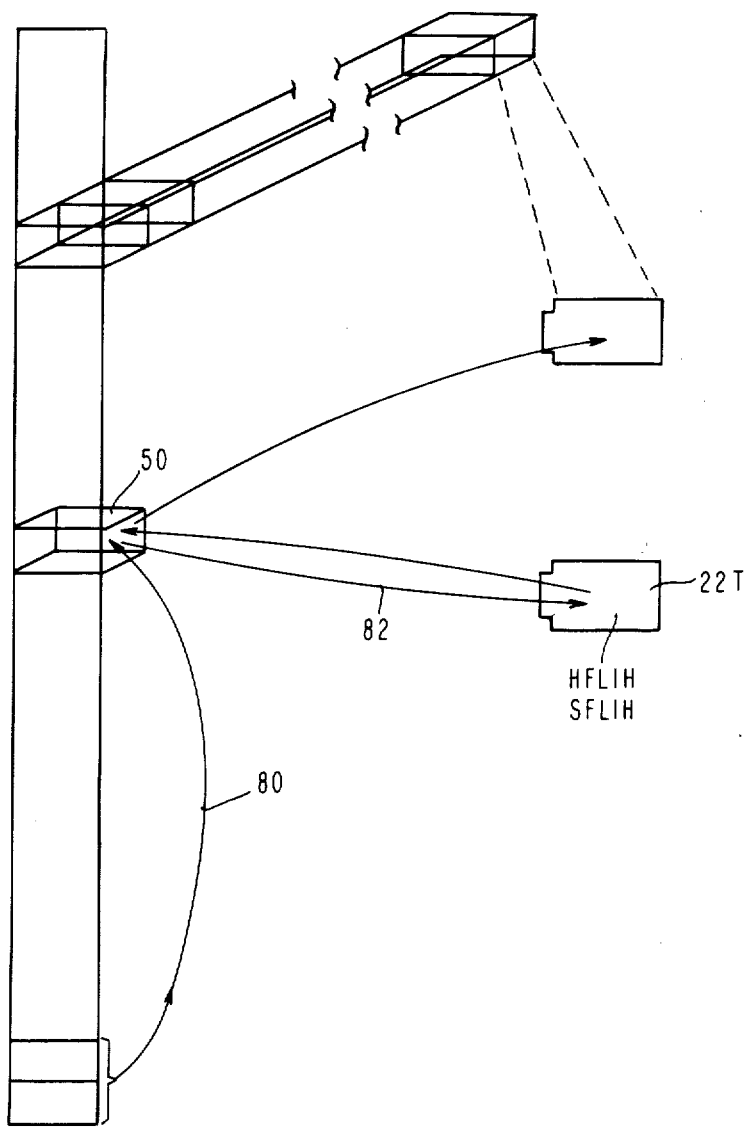
FIG. 5 is a diagram representative of the accessing of the tables shown in FIGS. 3 and 4 when the tables are themselves resident on a pluggable adapter unit.

It is convenient, and a feature of the instant invention, to locate the HFLIH and SFLIH tables in RAM on a pluggable card 22T. FIG. 5 is a schematic representation of such an arrangement. In that figure, a hardware or software vector initiated action, indicated at 80, is in fact transferred via the control module or component 50 to the card 22T, as indicated at 82, which card is accessed.

What is claimed is:

1. In a system comprising a processor, memory addressing means defining a finite memory address space, and an indefinite plurality of memory containing modules connectable into said address space, the improvement comprising:

each of said modules having an identification indicium which is different from that of any of the other of said plurality of modules, each of said modules having memory address decoding means responsive to addresses in one common segment of said address space, each of said modules having an identifier register writable by said processor, and each of said modules having comparison means sensitive to the contents of its said identifier register and operative upon a predetermined relationship of the contents of said register to the indicium of the module to enable said memory on that module to respond to said addresses in said one common segment so long as that module is enabled and to the exclusion of the others of said modules, whereby said modules effectively occupy said segment of said address space selectively and one at a time.

2. A system in accordance with claim 1, further comprising means defining a table identifying those said modules acutally connected into said system and the location, outside said address space, defining the current status of each said connected module.

3. A system in accordance with claim 2, further including means utilizing said table to examine the status of the devices listed in the table for a given status and to broadcast to said identifier registers an indicator value having said predetermined relationship to the said identification indicium of devices having said status, one at a time, whereby the thus selected devices are enabled one at a time.

4. Data processing apparatus having a central processor connected to a plurality of ports to any or all of which may be attached a selection from a group of compatible devices, each incorporating means signifying its individual identity in terms distinguishing it from each of the others of said devices, some of the devices of the group including memory and a status register, requests for service from attached devices being ORed to the central processor, the central processor being arranged on power up and system reset to initialize and determine the function and location of the currently attached devices, the central processor including a memory accessing facility for accessing memory in terms of a fixed size address space and a register accessing facility for accessing individual registers in attached devices using register addresses which are independent of the memory address space, characterized in that (a) the initializing facility includes means for generating a (first) list associating the individual identity of each attached device including memory with the register address of the status register of that device;

(b) the central processor is arranged to respond to a request for service by accessing the list and by indexing through the list, examining the status of each listed device in turn to determine if the currently examined device requested service and, if so, broadcasting the identity of that device followed by one or more memory addresses; and (c) each device having memory also including means for comparing each brodcast identity with the identity of the device and, on detecting equality, to latch the associated memory enabled to the exclusion of all of the others of said devices until the first detected inequality, and in that (d) the enabled device appears as a single entity to the central processor and occupies a single window in the address space which is common to all of said devices but used by them only one at a time.

5. Apparatus as claimed in claim 4 wherein some of the devices of the group which include memory have stored therein, independent of powering up and system reset, routines defining system functions which are identifiable in terms of system function, the initializing facility including means for generating a second list associating each device providing system function with the individual identity of the providing device, the central processing unit obtaining any one of the listed system functions by accessing the second list by system function and broadcasting the associated device identity followed by one or more memory addresses.

6. Apparatus as claimed in claim 4 or claim 5 wherein the initializing facility is arranged to retain the generated list or lists in writable memory on one of the attached devices.

7. A system comprising
a processor,
addressing means defining a finite memory address space, and
a plurality of modules connectable into one common segment of said address space for access by said processor,
each of said modules having address decoding means responsive to address in said common segment of said address space, at least one of said addresses being decodable by said decoding means of more then one of said modules,
each of said modules having an identification indicium which is different from that of any of the other of said plurality of modules said decoding means of which is responsive to a same address,
each of said modules having an identifier register writable by said processor for receiving identifier data broadcast to all of said plurality of modules by said processor, and
each of said modules having comparison means sensitive to the contents of its said identifier register and operative upon and during a predetermined relationship of the contents of said register to the indicium of the module to enable that module to respond to a predetermined set of addresses comprising said one common segment so long as that module is enabled and to the exclusion of all other modules of said plurality of modules having a different identification indicium.

* * * * *